Nov. 1, 1932.  S. G. WEILER  1,886,239
STOVE
Filed Aug. 23, 1930  3 Sheets-Sheet 1

Inventor
Sigmund G. Weiler
Attorneys

Nov. 1, 1932.  S. G. WEILER  1,886,239
STOVE
Filed Aug. 23, 1930  3 Sheets—Sheet 2

Inventor
Sigmond G. Weiler
By Young & Young
Attorneys

Nov. 1, 1932.  S. G. WEILER  1,886,239

STOVE

Filed Aug. 23, 1930   3 Sheets-Sheet 3

Inventor
Sigmond G. Weiler
By Young & Young
Attorneys

Patented Nov. 1, 1932

1,886,239

UNITED STATES PATENT OFFICE

SIGMOND G. WEILER, OF MILWAUKEE, WISCONSIN

STOVE

Application filed August 23, 1930. Serial No. 477,411.

This invention relates to improvements in stoves.

One of the objects of this invention is the provision of an improved type of cook stove, together with a housing for enclosing the stove, whereby the construction is such as to permit its being seated in a recess in the wall of a room so as to be entirely removed from the room and having the main portion thereof flush with the outer surface of the wall, whereby to increase the usual area of a kitchen or the like, whereby a comparatively small kitchen can be used with the stove set into the wall beyond the outer surface thereof and readily accessible from the kitchen.

Another object of the invention is the provision of a stove which is entirely housed within a wall and provided with an outtake flue or chimney so as to readily convey the cooking odors from the stove instead of permitting their escape into the kitchen or other room in which the cooking is being done, and the construction of the housing inclosing the stove is such as to permit the entire front thereof to be enclosed while the cooking is in progress, reducing to a minimum the chances of the cooking odors and heat escaping into the room.

A further object of the present invention is the provision of a cooking stove, wherein the operative parts of the stove are enclosed within a suitable housing which can be opened at one side thereof to provide access to the stove, while during the process of cooking, the stove will be entirely enclosed within the housing so that the cooking odors will be readily conveyed to the exterior by means of a suitable chimney or flue.

A still further objection of the present invention is the provision of an improved stove enclosed within a housing set within a recess in the wall, and so arranged as to have the front of the housing flush with the outer surface of the wall, thus the entire surface area of a room can be utilized while the stove is in such position as to be readily used when desired, and can be quickly enclosed when not in use by means of sliding and swinging doors with novel means for retaining the sliding doors for the upper portion of the stove in a closed position.

One of the important objects in view is the provision of a cooking apparatus comprising a cabinet which can be produced in standardized size for reception of conventional cooking units or elements, such as burners, ovens and the like, and which is provided with closures to prevent the escape of odors and heat into the room, and which can be built into a wall to economize on space in the kitchen.

With the above and other objects in view, the invention consists in the novel features of construction, the combination and arrangement of parts hereinafter more fully set forth, pointed out in the claim and shown in the accompanying drawings wherein:

Figure 2:
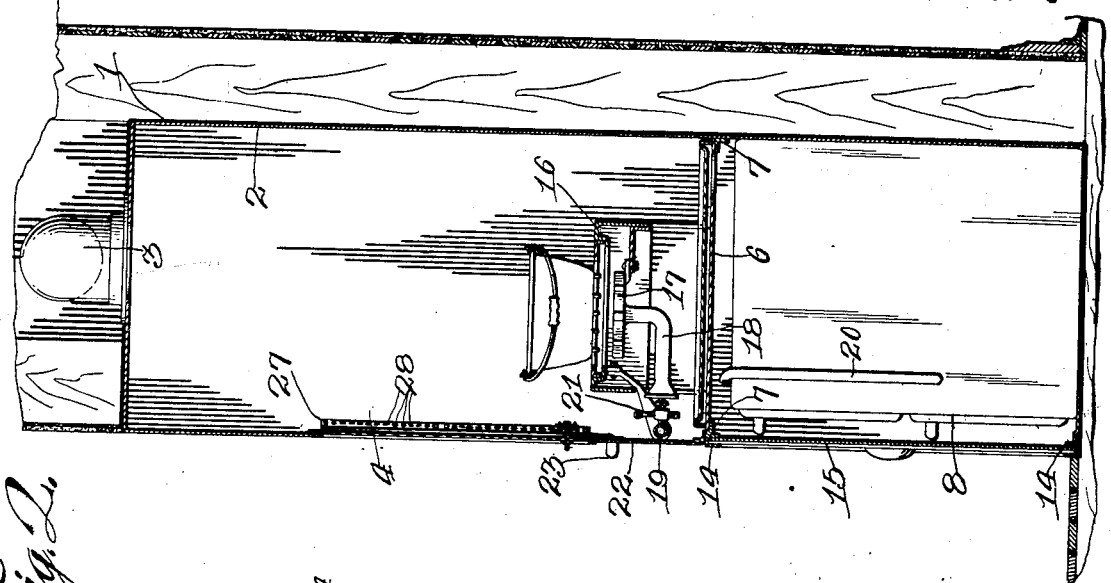
Figure 2 is a vertical sectional view on the line 2—2 of Figure 1.

In carrying out this invention, it is preferable to have the wall of a room provided with a recess or cutout portion as shown at 1 and within this cutout or recess portion, the housing 2 is arranged having a flue outlet 3 at the top thereof, and it will be noted from the showing in the drawings, that the front of the housing 2 is substantially flush with the wall of the room. The housing 2 is preferably formed from sheet metal and is divided into two separate chambers, the upper chamber 4 and the lower chamber 5, the horizontal partition 6 dividing these chambers as illustrated. The partition member 6 has its edges resting upon the angular brackets 7, secured to the walls of the housing 1, as shown in Figure 2, and the lower compartment is preferably divided into separate chambers, one of which contains the oven 8, while the other chamber generally indicated at 9 is divided into upper and lower compartments by means of a horizontal partition 10, the edges of which are slidably mounted within the guides 11 attached to opposite side walls of the chamber 9. A convenient shelf 12 is arranged within compartment 9 below partition 10 upon which dishes or cooking utensils may be placed, while cooking utensils and the like may be supported upon partition 10.

Figure 1:
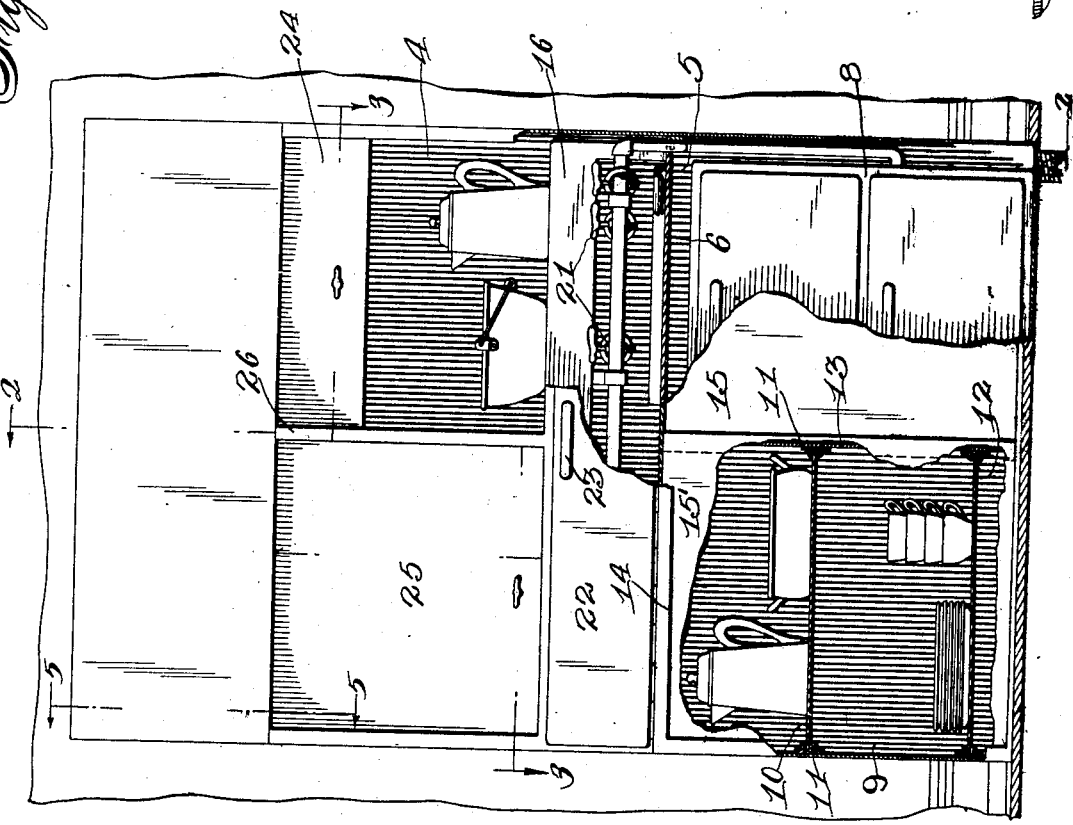
Figure 1 is a front elevation of a stove and housing constructed in accordance with my invention.
Figure 3:
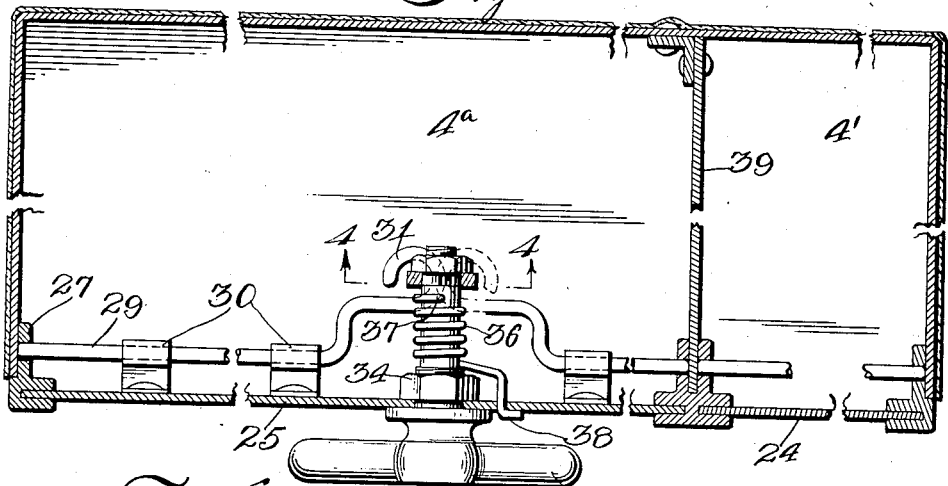
Figure 3 is a horizontal section on the line 3—3 of Figure 1.
Figure 4:
Figure 4 is a detail section on the line 4—4 of Figure 3.
Figure 5:
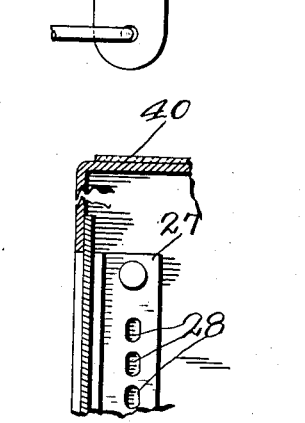
Figure 5 is a detailed section on the line 5—5 of Figure 1.

The oven compartment and compartment 9 are divided by means of the vertical partition 13 and slidably mounted within suitable guides 14 are the door members 15 and 15′ which slide past each other, as shown in Figure 1, so that when the oven 8 is in use, the door 15 can be moved laterally behind door 15′ to permit access to the oven.

When it is desired to gain admittance to compartment 9, the door 15′ is moved laterally in guides 14 to a position in front of door 15, thus either one of the sections of the lower compartment 5 may be readily opened or closed through the movement of doors 15 and 15′.

The compartment 4 has arranged therein a cooking plate 16, provided with a number of burners, one of which is generally indicated at 17 and each burner is provided with a supply pipe 18 connecting with the main supply pipe 19. A branch pipe 20 leads from pipe 19 down to the oven 8, as disclosed in Figures 1 and 2, and the admittance of fuel to the burner 17 is locked by means of the valve members 21.

That portion of the housing in which the valve members 21 are located is normally closed by means of a swinging door 22 which swings downwardly away from the body of the stove and rests in a horizontal plane when it is desired to control a flow of fuel to the burners and this door is provided with a handle 23 to permit manual manipulation of the same.

The entrance to compartment 4 above the plate 16 is normally closed by means of the vertical sliding doors 24 and 25 arranged upon opposite sides of a central guide 26 and these doors may be quickly and easily moved through a vertical plane either to an open or a closed position, so that access to the cooking plate 16 may be gained, or the upper compartment 4 can be entirely closed while articles are being cooked.

These doors 24 and 25 may be maintained in an open, closed, or partially open position by means of suitable mechanism which includes the vertical plates 27 having a plurality of recesses 28 in which the ends of rods 29 fit. The rods 29 are slidably mounted within bearing sleeves 30 and having their adjacent ends provided with hook portions 31 connected to opposite ends of a plate 32 mounted upon a rotatable shaft 33 carried by one of the doors. The shaft 33 is connected to the door 25 by means of a clamping nut 34, and is provided at its outer end with a handle portion 35 for rotating shaft 33. In order to normally maintain the outer ends of rods 29 projected into one of the openings or recesses 28, a coil spring 36 is mounted on shaft 33 with one end connected to the shaft, as shown at 37, while the other end is connected to the door 25, as shown at 38. Thus, turning movement on the part of the handle 35 will rotate shaft 33 and rock plate 32 which in turn will reciprocate the rods 29.

At this point, it might be well to call attention to the fact that the upper compartment 4 is divided into two chambers 4′ and 4a with a vertical partition 39 dividing the two compartments, and it may be so arranged as to provide a cooking plate 16 in each one of these compartments or a continuous plate may extend through the partition 39 into each one of the compartments 4′ and 4a.

In arranging the housing 2 within the recess 1, it is preferred to have a layer of insulating material 40 arranged between the housing and the joists in the wall, so as to reduce to a minimum the chances of the heated housing from setting fire to the wall, and this insulating material may be of any well known product on the market.

While the housing 1 is described and illustrated as to the arrangement of the different compartments and chambers, it will be apparent that various ways may be devised for dividing the entire housing into different sized compartments, but the main purpose of the invention is to provide a stove of this character which is entirely enclosed within a housing set into a recess in the wall so that the front of the housing will be substantially flush with the wall of the room in which the device is located.

Thus, the stove when not in use will be entirely out of the way and will not occupy any of the original room space, and a comparatively small kitchen can be so arranged as to have plenty of room, and it is believed that the convenience of this particular location for the stove will be greatly appreciated.

Figure 6:
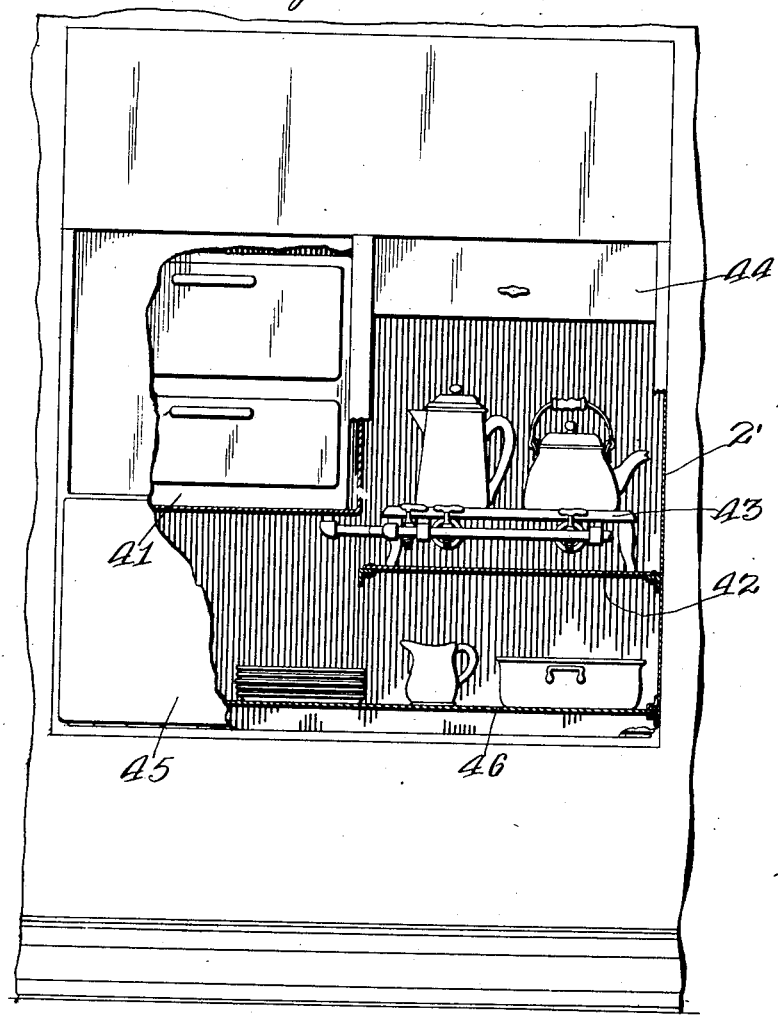
Figure 6 is a front elevation illustrating a slightly modified form of the invention.

In Figure 6, I have illustrated a modified form of the invention wherein the recess for the housing 2′ does not extend all the way to the floor as in the preferred form of the invention, and the housing is somewhat shorter in length and is provided at one side thereof with the oven chamber 41, while a shelf 42 is supported in the main portion of the housing to provide a platform for the burner plate 43.

A sliding door 44 may be used for closing one side of the housing, while a large swinging door 45 is used for closing the lower portion of the housing. The lower portion of the housing has arranged therein a shelf 46 for supporting cooking vessels and other utensils which will be useful about the stove, as shown in Figure 6.

The arrangement of the device illustrated in Figure 6 will prove very convenient for small apartments where the kitchen is rather small and where the use of the entire room may be obtained by setting the stove into a recess in the wall, so that the outer portion of the stove and the housing will be disposed flush with the wall of the room. This latter construction is very simple and can be manufactured and installed at a very low cost, but will prove very convenient for the purpose intended.

Figure 7:
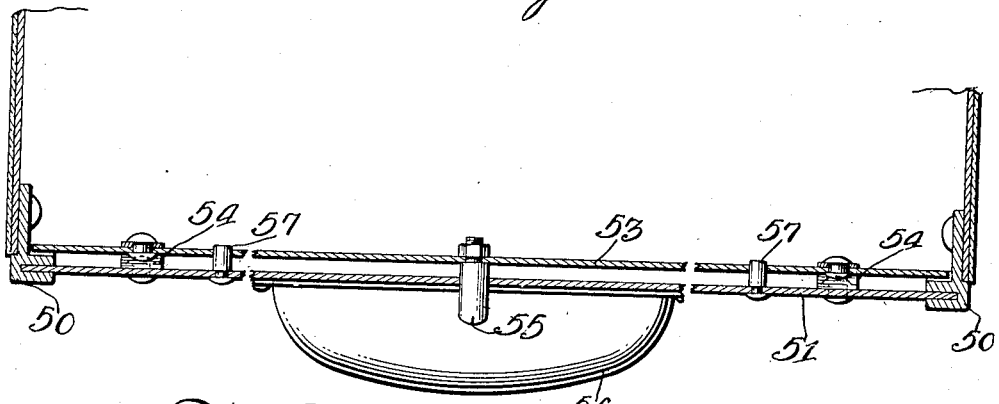
Figure 7 is a transverse sectional view taken on the line 7—7 of Figure 8, illustrating a modified form of the fastening member for the sliding doors.
Figure 8:
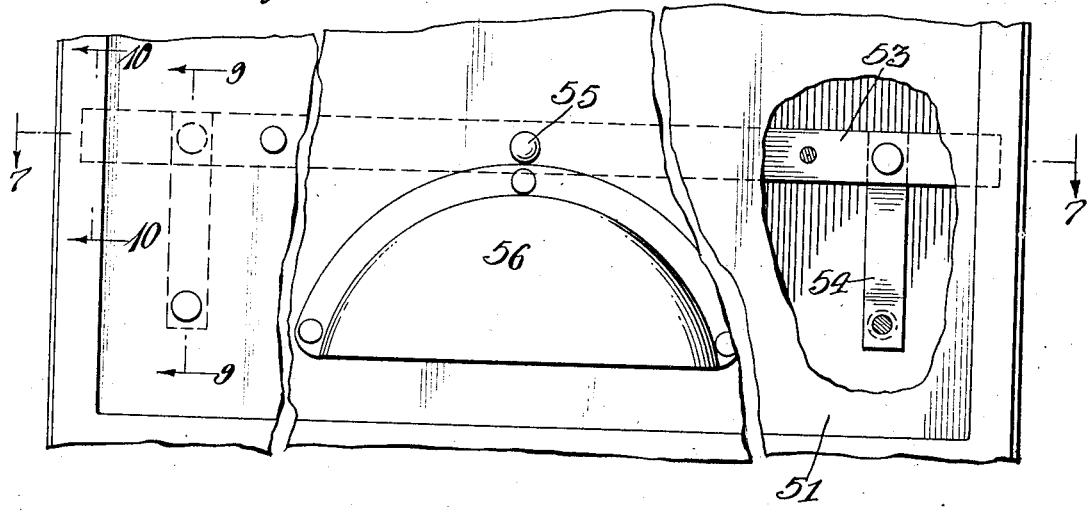
Figure 8 is a front elevation with parts thereof broken away and illustrated in cross section.
Figure 9:
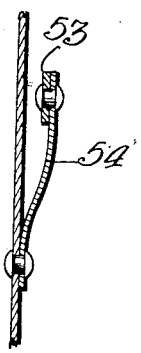
Figure 9 is a detailed section taken on the line 9—9 of Figure 8.
Figure 10:
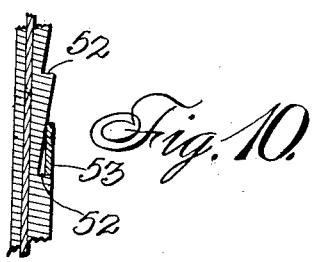
Figure 10 is a detailed section taken on the line 10—10 of Figure 8.

Referring to Figures 7 to 10 inclusive, there is illustrated a slightly modified form of retaining means for the sliding doors, and in this form of the invention, the guides 50 for the door 51 are provided upon their inner faces with spaced notches 52 and attached to the inner side of the door 51 is a retaining bar 53 which extends transversely of the door, as illustrated in Figures 7 and 8. The bar 53 is attached to the door 51 by means of the spring members 54 arranged adjacent the side edges of the door as illustrated, and connected to the center portion of the bar is an actuating pin 55 which is movably disposed in an opening in the door at a point just above the handle 56.

In Figure 7, the bar 53 is illustrated in a normal locking position and in order to retain the ends of the bar in engagement with one of the notches on each side of the door, guide pins 57 are provided and these pins are arranged upon opposite sides of the center of the door and in close proximity to the spring members 54. Therefore, when it is desired to open or close the door 51, the operator grasps the handle 56 and engages pin 55 with the thumb, pressing inwardly upon this pin so as to remove the bar 53 from pins 56 and the ends thereof from the notches 52 against the tension of springs 54, and as soon as the door has been adjusted to the proper open or closed position, the pin 55 is released, whereby the tension of springs 54 will return the bar 53 so that the ends thereof will engage one set of notches 52 to retain the door against further movement.

The particular form of retaining mechanism illustrated in Figures 7 to 10 inclusive, is of a very simple nature and any one desiring to open or close the door 51 merely grasps the handle 56 and presses inwardly upon pin 55 and after the door has been moved to the desired position, it is only necessary to release the pin 55, whereby the bar 53 will return to its normal locking position, thus providing very simple and inexpensive means for retaining the door 51 in any desired adjusted position.

I claim:

The combination with the wall of a room of substantially ordinary thickness having a recess therein and a flue, of a fireproof cooking equipment including a completely closed rigid metallic casing of the same size as the recess and snugly fitted therein, said casing having its outer face flush with one face of the wall, a row of cooking burners in the casing arranged in longitudinal alignment whereby to reduce the width of the casing, so that the casing can be used in the wall of substantially ordinary thickness, and an outlet flue communicating with the upper end of the casing and the flue in the wall, said casing having its outer face provided with entrance doors adapted to enclose the cooking burners.

In testimony that I claim the foregoing I have hereunto set my hand at Milwaukee, in the county of Milwaukee and State of Wisconsin.

SIGMOND G. WEILER.